Sept. 30, 1930.   H. J. MURRAY   1,777,012
SEQUENTIAL ACTION SYNCHRONIZER
Filed Sept. 3, 1925   2 Sheets-Sheet 1

INVENTOR
Howard J. Murray
BY
Warren S. Orton
ATTORNEY

Sept. 30, 1930.   H. J. MURRAY   1,777,012
SEQUENTIAL ACTION SYNCHRONIZER
Filed Sept. 3, 1925   2 Sheets-Sheet 2

INVENTOR
Howard J. Murray
BY
Warren S. Orton
ATTORNEY

Patented Sept. 30, 1930

1,777,012

UNITED STATES PATENT OFFICE

HOWARD J. MURRAY, OF BROOKLYN, NEW YORK, ASSIGNOR TO R. M. COMPANY, INC., OF EAST PITTSBURGH, PENNSYLVANIA, A CORPORATION OF DELAWARE

SEQUENTIAL ACTION SYNCHRONIZER

Application filed September 3, 1925. Serial No. 54,386.

The invention relates in general to a variable speed power transmission mechanism of the multiple speed gear shift type and in which a power driving or driven member, and a load carrying shaft or other member are coordinated through the temporary interposition of a friction clutch, so that the members will tend to assume a speed of rotation approximately equal to each other before they are moved into their intermeshed or interclutched position.

In the present disclosure, while the invention is not limited to the special application illustrated, it is illustrated in connection with an embodiment of the invention particularly designed to meet the requirement of transmission mechanism where the connecting gears, that is, the gears between the transmission shaft and the usual jack shaft, are constantly in mesh, but in general the illustrated showing is intended to disclose the application of the invention to any situation where a mechanical clutch is provided between a driven shaft and a coacting driving member such as an end member of the gear train.

The primary object of the invention is to provide a simplified form of synchronizer by means of which an almost instantaneous synchronizing is attained between the relatively moving parts of a mechanical clutch just prior to the movement of the clutch into its operative driving position.

The invention features an organization which can be actuated without difficulty or need of excessive manual force to effect the sequential synchronizing and clutching and by means of which the jaw elements of the mechanical clutch are practically snapped to the same speed with a slight lapse of time as they are moved towards their clutching position.

Another object of the invention is to provide a form of synchronizer which will normally be free of any engagement with associated parts which will engage only during the act of synchronization and which will automatically become again dissociated as soon as the synchronizing has become effective.

Various other objects and advantages of the invention will be in part obvious from an inspection of the accompanying drawings and in part will be more fully set forth in the following particular description of one form of device embodying my invention, and the invention also consists in certain new and novel features of construction and combination of parts hereinafter set forth and claimed.

Referring to the accompanying drawings.

Figure 1:
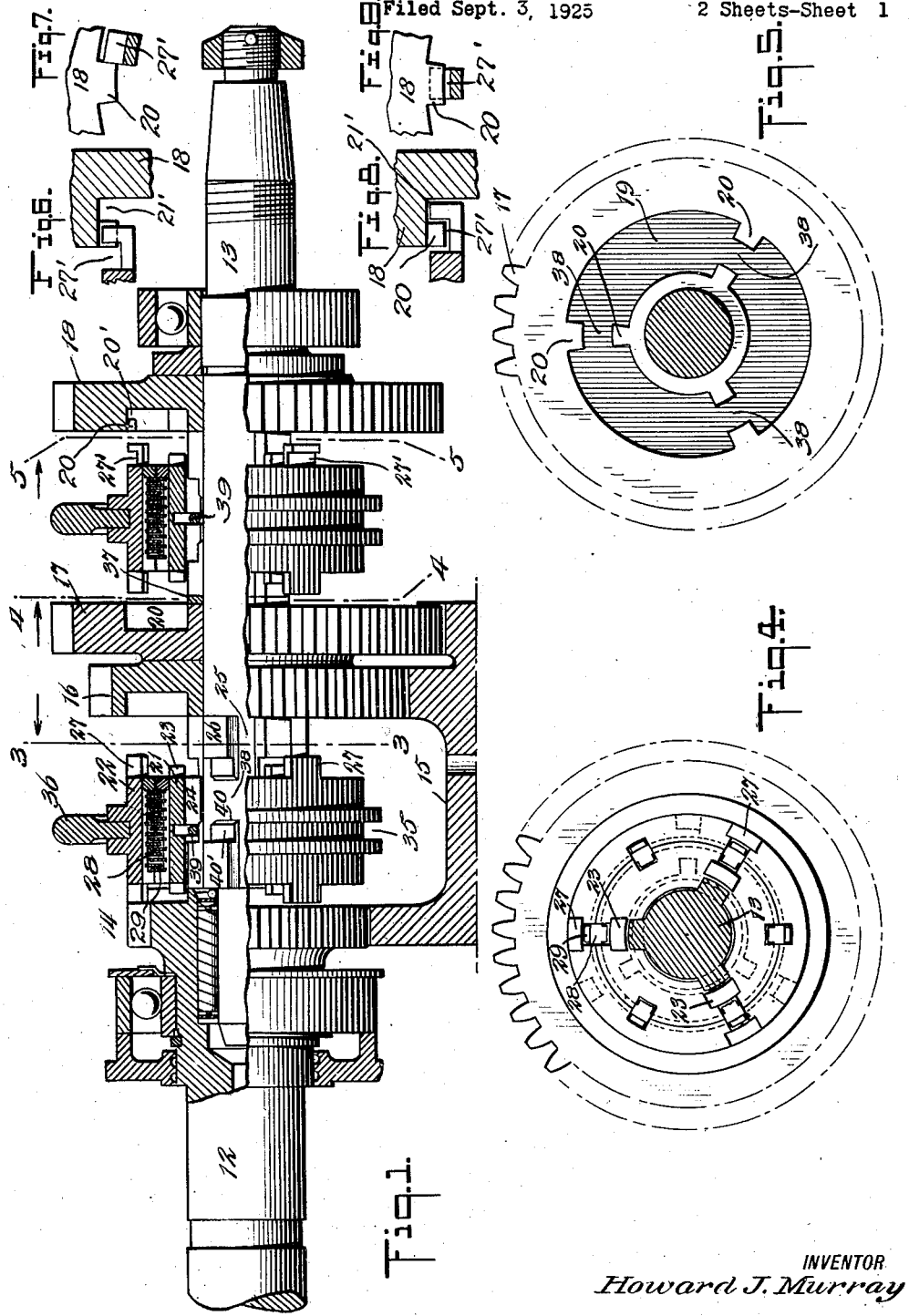
Figure 1 is a fragmentary view of a portion of a variable speed transmission with parts broken away and other parts shown in elevation and illustrating a preferred embodiment of the invention with the mechanical clutch forming part of the left hand synchronizer in its fully meshed driving position and with the right hand synchronizer shown in its normal, neutral, inoperative position.

Figures 4 and 5 are similar views taken respectively on the lines 4—4 and 5—5 of Figure 1 looking in the direction indicated by the arrows.

Figs. 6-9 inclusive are detailed showings of the driving connection shown at the upper right hand side of Fig. 1;

Fig. 6 being an enlarged showing of the finger and tooth as the finger is moved from the right in Fig. 1;

Fig. 7 is a view in side elevation of the showing in Fig. 6;

Fig. 8 is a view similar to Fig. 6 showing the finger fully advanced into the groove; and Fig. 9 is a view in side elevation of the parts in the position shown in Fig. 8.

In the following description and in the claims, parts will be identified by specific names for convenience of expression but they are intended to be as generic in their application to similar parts as the art will permit.

Referring particularly to Figure 1 there is shown a power shaft 12 which for the purpose of this disclosure may be considered as a part of the engine driven shaft in an automotive vehicle power plant operatively connected to the gear trains hereinafter described to drive an aligned shaft 13 which may be considered as a propeller shaft connected to drive the traction wheels of an automobile.

The inner end of the shaft 12 is provided with the usual third speed gear 14 in permanent meshed driving connection with a jack shaft gear 15 and which in turn is in mesh with gears 16 and 17 loosely mounted on the shaft 13 to obtain second and first speed constructions. There is also mounted on the shaft 13 a gear 18 constituting part of the gear train which causes the reverse drive as is usual with such constructions. It is understood that the gears 14, 16, 17 and 18 are mounted loose upon the portion of the shaft on which they are journalled and it is obviously within the scope of the disclosure to insert anti-friction devices as part of the gear mounting mechanism.

The gears are arranged in pairs, 14 and 16 facing each other and 17 and 18 facing each other, and the gears of each pair are designed to constitute opposed fixed members of a compound mechanical clutch with a single coacting movable element, movable therebetween to effect a selective clutching. The inner face of each of the gears is provided with segmental recesses 19 (see Fig. 5). These recesses are three in number, spaced circumferentially apart by ribs 20 which form teeth and this construction is designed to constitute one of the pair of relatively fixed jaws, considered axially of the shaft, and forms part of the mechanical clutch for clutching the gear with the shaft 13.

Where it is desired to effect an automatic unclutching of the synchronizer after it has functioned a releasing between the synchronizer and its engaged gear is provided; for this purpose the teeth forming ribs 20 are each cut away to form an L-shaped groove as shown at 20' to permit the escape therethrough of the synchronizer teeth hereinafter described.

Positioned between each pair of gears is the combined clutch and synchronizing device particularly constituting the subject matter of this disclosure. The synchronizing device includes essentially two telescopic rings, an inner ring 21 and an outer ring 22. The inner ring 21 has projecting from opposite edges thereof teeth 23 which when in engagement with the rib forming teeth 20 of its coacting gear provide a mechanical driving clutch between the shaft and the engaged gear. The ring 21 is provided on its inner face with splines 24 which slide in the slots 25 formed between the splines 26 formed on the portion of the shaft along which the synchronizer is designed to slide.

The outer ring 22 is likewise provided with laterally projecting jaw teeth 27 also designed when shifted towards its coacting gear to form a clutching connection with the gear. However, the teeth 27 are slightly longer considered axially of the shaft than the teeth 23 so that when the synchronizer is shifted as a unit, the teeth 27 will engage with the gear ahead of the engagement therewith of the teeth 23.

Positioned between the rings 21 and 22 is a friction clutch indicated generally by the reference character 28 and which preferably is formed of a plurality of friction disks 29 with each alternate disk engaging respectively in slots 30' and 30 formed in the outer periphery of the ring 21 and in the inner periphery of the ring 22. The disks are slipped onto the rings with the end disk 29 engaging against stops 31 and 32 formed respectively on the rings 22 and 21 and held in position by stop rings 33 and 34 shrunk into position between the rings. The stop rings are set in such position as to give the requisite degree of frictional resistance between the friction disks. One form of a multiple disk mounting and which may be used here with obvious mechanical changes is disclosed in my co-pending application, Serial No. 48,559, filed August 6, 1925. This application has matured into Patent No. 1,738,788, granted December 10, 1929.

Preferably the synchronizer unit including the rings 21 and 22 with the friction disks fitted therebetween is constructed as a mechanical entity ready to be installed in position with the gear on the shaft.

The outer ring 22 is provided with a peripheral groove 35 in which is positioned the usual shift fork 36.

For the purpose of locating the gears 16 and 17 against axial movement they are caused to abut against one or more of the splines 26. The portion of the shaft between the gears 14 and 16 is provided with six splines 26 while the portion of the shaft between the gears 17 and 18 contains but three splines. In this way it is possible to slide the left hand ring 21 with its six splines onto the left hand portion of the shaft 13 and the exposed ends of three of the splines provides an abutment for limiting the right to left movement of the two gears 16 and 17. A split locking ring 37 engages the right hand side of the gear 17 and this prevents a left to right movement axially along the shaft of the gears 16 and 17.

In either case the splines are cut away at their center to provide a relatively wide space 38 in which in the normal, inoperative position of the synchronizer there is a deterrent spring 39 in the form of a ring frictionally clutching the portion of the shaft contained in the peripheral groove formed by the adjacent ends of the splines. Preferably the ends of the splines defining this groove are each cut down to provide shoulders 40' the ends of which are sharply bevelled as shown at 40.

The spring 39 provides a resilient resistance to the freedom of axial movement of the inner ring 21 as it is moved along the shaft by the shifting of the synchronizer device as a whole. As the spring is shifted up the incline 40 is expands until it is moved along the top 40'. During this movement it acts as a drag on the inner ring thus to hold the clutch disks attached thereto while the shaft fork 36 acting through the outer ring 22 causes the clutch disks attached thereto to bear on the restrained disks. In this way the pressure of the fork 36 causes the multiple disk clutch illustrated to frictionally connect the outer and inner rings in driving relation.

Where the L-shaped grooves 20' are used the rear portion of each of the teeth 27 is provided with a recess 27' spaced from its advanced end and of a size to permit the rib 20 to pass therethrough when the parts are in position shown at the left of Fig. 1.

Figure 2:
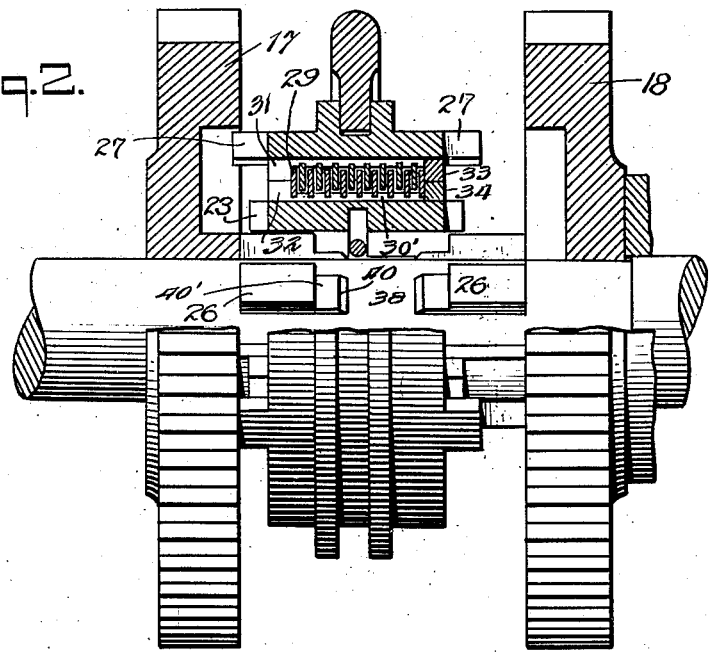
Figure 2 is an enlarged view of the right hand synchronizer of Fig. 1 shifted therefrom to the left and its coacting units, showing its mechanical clutch in inoperative position and with the synchronizer operatively disposed just prior to its position before the mechanical clutch becomes effective and showing a modified form of spline shaft and with certain parts omitted.
Figure 3:
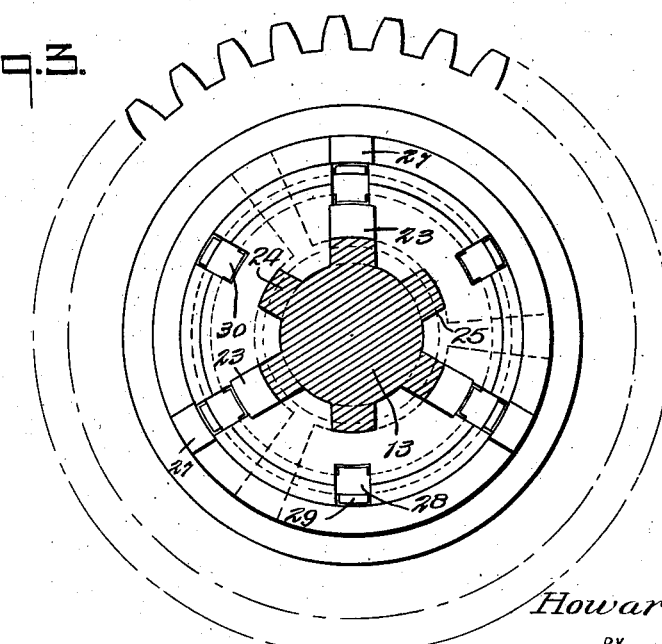
Figure 3 is a transverse sectional view taken on the line 3—3 of Figure 1 looking in the direction indicated by the arrow.

In operation and assuming that all of the parts are in their normal neutral inoperative position, that either one of the shafts is moving at a rate different from the other shaft and that it is desired to make a driving connection, such for instance, as a connection to obtain the first or low speed driving condition in automotive vehicle transmission. Initially the synchronizing unit will be idling in the position shown at the right hand side of Fig. 1. A shifting of the fork from this position to the left will cause the most advanced edge of the teeth 27 to engage in one of the recesses 19 and due to the relative rotary movement between the synchronizer and the gear this will bring the ring 22 of the right hand synchronizer unit into clutching engagement with the gear 17 and the ring 22 will of course spin with this gear. By this time the deterrent spring 39 will be riding up the inclines 40 onto the shoulder portions 40' of the splines. The spring will act to retard the freedom of axial movement of the ring 21. In this way the friction clutch is brought into active operation and one of the rings is brought promptly into the rotary speed of the other, or differently expressed the jaw elements 23 of the mechanical clutch being keyed to the shaft are promptly brought into synchronization with the gear 17 with which they are intended to mesh. A continued axial movement of the synchronizer from the position shown in Figure 2 into the position shown at the left hand side of Figure 1 causes the teeth 23 to be moved into fully meshed engagement with the synchronized gear 17. By this time the forward ends of the teeth 27 have passed beyond the teeth 20 and due to the clearance provided by the L-shaped grooves 21' the ring 22 is now free of the gear 17.

Where it is desired to restore the parts to their normal inoperative position pressure on the shift lever in the reversed direction, that is from left to right of the showing in the figures, will cause the shiftable clutch jaws to be moved into their inoperative position spaced from both of the coacting gears as shown at the right hand side of Fig. 1.

It is noted that by means of the device illustrated it is possible to assemble the gears and synchronizing units on a solid shaft simply by an endwise movement of the parts; these parts are accurately located in position and the locating of the several parts is preset by the location of the necessary splines at the time the shaft is machined. It is simply necessary that there be an unequal number of splines on the different parts and that the end of one of the splines terminate at the point where the next element is to be located.

A shaft such as is herein described can be accurately machined and the inner periphery of rotatable members such as the gears 16 and 17 can be accurately trued to provide a smooth bearing on the machined shaft.

The clutching element of the synchronizer is free of any connection at all times except during the act of synchronizing, so that the usual wear occurring at this place has been eliminated. The synchronizer when in neutral position is disconnected and the usual wear between the synchronizer and its associated parts has been eliminated or at least materially minimized.

As the outer ring which first makes the initial driving connection is of light mass and thus possesses slight momentum the synchronizing can be easily effected with resulting elimination of the knocking or jerking which characterizes known forms of synchronizing devices of the type under discussion.

Having thus described my invention, I claim:—

1. In a device of the class described, the combination of a shaft, a power member mounted for rotary movement about the axis of the shaft and provided on the side with an element of a mechanical clutch, a synchronizer slidably mounted on the shaft, means between the synchronizer and shaft tending to restrain the freedom of axial movement of the synchronizer in its movement towards said power member, said synchronizer including a multiple disk friction clutch, one set of said disks splined to the shaft, control means acting on the coacting set of disks to move the friction clutch into operaive position and to shift the synchronizer as a whole into engagement with the power member, each set of disks provided with a mechanical clutch element adapted when moved into engagement with the coacting element on the side of the power member to complete a mechanical clutching engagement therewith, the mechanical clutch element on the set of disks engaged by the control means being positioned in advance of the corresponding element of the set of disks splined to the shaft whereby there is provided in sequence a mechanical clutching of the synchronizer with the power member, a frictional clutching of the power member with the shaft and then a mechanical clutching of the power member with the shaft independent of the friction clutch.

2. In a synchronizing device, the combination of a shaft, a member mounted for rotary movement about the axis of said shaft, a synchronizer having a part thereon splined to the shaft and movable axially thereon relative to said member, said synchronizer including two relatively movable coacting frictional clutch elements each provided with means for engaging said member to provide a positive clutching engagement therewith, means between the shaft and one of the elements for retarding its freedom of axial movement and a control engaging the other element for shifting the same and for shifting the unit as a whole.

3. In a synchronizing device, the combination of a shaft, a member mounted for rotary movement about the axis of said shaft, a synchronizer having a part thereof splined to the shaft and movable axially thereon relative to said member, said synchronizer including two relatively movable coacting frictional clutch elements each provided with means for engaging said member to provide a positive clutching engagement therewith and means between the shaft and one of the elements for retarding its freedom of axial movement.

4. In a synchronizing device, the combination of a shaft, a member mounted for rotary movement about the axis of said shaft, a synchronizer having a part thereof splined to the shaft and movable axially thereon relative to said member, said synchronizer including two relatively movable coacting frictional clutch elements each provided with means for engaging said member to provide a positive clutching engagement therewith.

5. In a synchronizing device, the combination of a shaft, a power member loose on the shaft, a synchronizer including a friction clutch slidable on the shaft relative to the power member and adapted to cause the power member and shaft to approach the same speed before they are mechanically connected, said synchronizer including a friction clutch having one of its elements splined to the shaft and provided with means coacting with the power member when moved into engagement therewith to provide a mechanical clutch between the shaft and power member, and said friction clutch including another element coacting with the element splined to the shaft to complete the friction clutch, said other element also provided with means coacting with the power member when moved into engagement therewith to provide a mechanical clutch between the power member and said other coacting element thereby to provide a driving connection between the power member and the shaft through said friction clutch.

6. In a synchronizing device, the combination of a shaft, a power member loose on the shaft, a synchronizer slidable on the shaft relative to the power member and adapted to cause the power member and shaft to approach the same speed before they are mechanically connected, said synchronizer including a friction clutch having one of its elements splined to the shaft and provided with means coacting with the power member when moved into engagement therewith to provide a mechanical clutch between the shaft and power member.

7. In a synchronizing device, the combination of a shaft, a power member loose on the shaft, a synchronizer including a friction clutch slidable on the shaft relative to the power member and adapted to cause the power member and shaft to approach the same speed before they are mechanically connected, said synchronizer including a friction clutch having one of its elements splined to the shaft and provided with means coacting with the power member when moved into engagement therewith to provide a mechanical clutch between the shaft and power member and means controlled by the shifting movement of the synchronizer on the shaft and operable in a timed sequence following the mechanical clutching of the splined element with the power member for intercepting the driving connection through the friction clutch.

8. In a device of the class described, the combination of two power transmitting members adapted to be positively connected to drive one from the other, a driving connection therebetween, control means acting thereon to move the same bodily relative to both members to and from an operative position, said connection including a synchronizer for causing the members to approach the same speed prior to becoming positively connected and said synchronizer including a friction clutch provided with a plurality of sets of interclutching friction surfaces and means governed by the action of said control means for causing in sequence a clutching of said members through said friction clutch and then a mechanical clutching of said members through said movable driving connection.

9. In a synchronizing device, the combination of a power transmitting member fixed axially and provided with means forming the relatively fixed element of two mechanical clutches, a synchronizing unit mounted for sliding movement axially relative to said member, said sliding unit including a friction clutch comprising two relatively movable members, each member provided with a coacting element of one of said clutches and each adapted to engage its associated means on the power transmitting member to turn therewith and one of said coacting elements being in advance of the other.

10. In a device of the class described, the combination of two power members, a combined synchronizer and mechanical connector adapted to be moved in one direction to cause the members to approach the same speed before they are mechanically connected, said connector including a friction clutch having one of its clutching elements in permanent positive mechanical driving connection with one of the power members, and its coacting clutching element provided with means for positively engaging the other power member, when the connector is advanced toward said other power member in the act of mechanically connecting the members.

11. In a device of the class described, the combination of two power members, a combined synchronizer and mechanical connector adapted to be moved in one direction to cause the members to approach the same speed before they are mechanically connected, said connector including a friction clutch having one of its clutching elements in permanent positive mechanical driving connection with one of the power members, and its coacting clutching element provided with means for positively engaging the other power member when the connector is advanced toward said other power member in the act of mechanically connecting the members.

12. In a clutch, the combination of alined shafts, clutch members mounted respectively on such shafts and rotatable therewith and having coacting clutch faces, one of the members comprising outer and inner concentric frictionally engaged sections and means tending to hold said sections frictionally engaged, the inner section being keyed to its shaft and the clutch face of the sectional member having portions on both sections and the portion of the clutch face on the outer section being arranged to engage the clutch face of the other member in advance of the other portion of the clutch face on the section keyed to the shaft.

13. In a clutch, the combination of driving and driven members having coacting teeth on their opposing faces, one of said members being shiftable axially into and out of engagement with the other and one of said members comprising outer and inner sections having coacting friction faces and means for holding the sections with the friction faces engaged, the teeth of the sectional member being provided partly on both sections and the portions of the teeth on the outer section being longer than the portions of the teeth of the inner section whereby the teeth on the outer section engage the teeth of the other member in advance of the teeth of the inner section.

Signed at New York in the county of New York and State of New York this 31st day of August A. D. 1925.

HOWARD J. MURRAY.